(12) United States Patent
Anthonis et al.

(10) Patent No.: US 6,190,638 B1
(45) Date of Patent: Feb. 20, 2001

(54) MOLECULAR SIEVES AND PROCESS FOR THEIR MANUFACTURE

(75) Inventors: Marc H. Anthonis, Hofstade; Antonie Jan Bons, Kessel-Lo, both of (BE); Johannes P. Verduijn, deceased, late of Leefdaal (BE), by Jannetje Maatje van den Berge, executrix

(73) Assignee: Exxon Chemical Patents Inc., Houston, TX (US)

( * ) Notice: Under 35 U.S.C. 154(b), the term of this patent shall be extended for 0 days.

(21) Appl. No.: 09/101,220

(22) PCT Filed: Dec. 20, 1996

(86) PCT No.: PCT/EP96/05813

§ 371 Date: Oct. 19, 1998

§ 102(e) Date: Oct. 19, 1998

(87) PCT Pub. No.: WO97/25272

PCT Pub. Date: Jul. 17, 1997

(30) Foreign Application Priority Data

Jan. 4, 1996 (GB) .................................................. 9600082

(51) Int. Cl.$^7$ ........................... C01B 39/40; C01B 37/02; B01D 71/02; B01J 29/40; B01J 29/035

(52) U.S. Cl. ........................... 423/702; 423/705; 423/707; 423/709; 423/710; 423/716; 423/DIG. 22; 502/4; 427/301; 427/327.2; 427/376.2

(58) Field of Search .................................. 423/702, 704, 423/705, 707, 709, 710, 716, DIG. 22; 502/4; 427/301, 372.2, 376.2

(56) References Cited

U.S. PATENT DOCUMENTS

| 4,375,458 | * | 3/1983 | Dwyer et al. | 423/705 |
|---|---|---|---|---|
| 4,606,900 | * | 8/1986 | Kacirek et al. | 423/709 |
| 4,778,666 | * | 10/1988 | Chu et al. | 423/700 |
| 5,240,892 | * | 8/1993 | Klocke et al. | 502/77 |
| 5,624,658 | * | 4/1997 | Fitoussi et al. | 423/705 |
| 5,637,287 | * | 6/1997 | Vaughan et al. | 423/704 |
| 5,871,650 | * | 2/1999 | Lai et al. | 210/653 |

FOREIGN PATENT DOCUMENTS

| 0150256 | | 8/1985 | (EP) . |
|---|---|---|---|
| 0173901 | | 3/1986 | (EP) . |
| WO9308124 | | 4/1993 | (WO) . |
| 93/08125 | * | 4/1993 | (WO) . |
| WO9425151 | | 11/1994 | (WO) . |
| WO9601683 | | 1/1996 | (WO) . |
| WO9601687 | | 1/1996 | (WO) . |

* cited by examiner

Primary Examiner—Mark L. Bell
Assistant Examiner—David Sample

(57) ABSTRACT

Mixtures of synthesis mixtures of different alkalinity's produce small MFI crystals that are not spherical.

27 Claims, No Drawings

MOLECULAR SIEVES AND PROCESS FOR THEIR MANUFACTURE

This invention relates to molecular sieves, to processes for the manufacture of the molecular sieves themselves and to the uses of such molecular sieves.

Molecular sieves find many uses in physical, physicochemical, and chemical processes, more especially as selective sorbents, effecting separations of mixtures of different molecular species, and as catalysts or catalyst precursors. In these applications, the crystallographically-defined open pore structure within a crystalline molecular sieve normally plays an important part.

There have been numerous proposals for the manufacture of molecular sieve layers, usually on a substrate. When the substrate is continuous and porous, and the pores of the substrate are covered to the extent that they are effectively closed, a molecular sieve membrane results; such a membrane has the advantage of being able to perform catalysis and separation simultaneously if required.

Most such layers have the individual particles, e.g., crystallites if the sieve is crystalline, or agglomerates, arranged randomly within the layer. As a result, a molecule that is intended to pass between opposite faces of the layer through a crystallographically-defined pore of a given shape and size must follow a tortuous path, thereby reducing the flux through the layer. Further, when the particles are arranged randomly, there are likely to be numerous voids extending through the thickness of the layer that are of cross-section sufficiently large to allow undiscriminated passage of all the species of molecule in a mixture through them, thereby preventing effective separation of the mixture's components.

In our International Application No. WO 96/101683, the disclosure of which is incorporated by reference herein, we have described a structure comprising a substrate and a crystalline molecular sieve layer (main layer) in which the crystals extend predominantly in a single direction, especially a direction transverse to the plane of the main layer, there being provided between the main layer and substrate an additional relatively thin layer. It will be understood that the main layer is not necessarily planar since a molecular sieve layer may be formed, for example, on an internal or external surface of a tubular substrate, but for simplicity a layer is described herein as if it were planar.

The relatively thin layer may be formed by applying to or forming on a surface of the substrate an initial, thin layer of "seed" crystals, from which the ordered crystals of the main layer may be grown. In the case of an MFI type zeolite, the main layer tends to form in such a way that it is the c-axis or the a-axis of the crystals that extends through the main layer thickness, that is to say, generally perpendicular to the main layer plane.

In the described process, the crystals in the seed layer are substantially spherical colloidal seeds, and the observed orientation of the crystals in the main layer results from growth of the main layer crystals in the direction of the c-axis and/or a-axis being favored. In certain applications, however, it is desired that molecules should pass through the sieve layer in the pores extending in the direction of the b-axis, in which case their path is less tortuous through the ordered layer than through a layer in which the crystals are arranged randomly.

It is know in the art that molecular sieve particles may be used for seeding the synthesis solutions for the preparation of larger molecular sieve particles. For such application of molecular sieve seeds it is desirable to be able to provide new molecular sieve seeds which have controlled particle size and/or particle size distribution and/or particle shape in order to be able to use such seeds for the manufacture of new molecular sieve materials. Furthermore new processes for the manufacture of such molecular sieve seeds are required.

It has now been unexpectedly found that MFI crystals may be formed which may be capable of forming stable colloidal suspension and which have a shape that is non-spherical. These MFI crystals are suitable for use inter alia as seed crystals in the manufacture of a structure comprising a substrate and a molecular sieve layer and as seeds for the manufacture of molecular sieve materials such as particulate molecular sieve materials.

The present invention provides a process for the manufacture of an MFI zeolite which comprises mixing (a) an aqueous alkaline synthesis mixture comprising a silica source and an organic template, the synthesis mixture having a molar $OH^-:SiO_2$ ratio of at most 1.4:1, with (b) an active synthesis mixture being either (i) an aged aqueous alkaline synthesis mixture comprising a silica source and an organic template, the synthesis mixture having a molar $OH^-:SiO_2$ ratio of at least 0.1:1 and molar organic template: $SiO_2$ ratio of at least 0.1, or (ii) an active mother liquor which is derived from an aqueous synthesis mixture which has been used for at least one crystallisation and the formed crystals having been removed, and subjecting the mixture of (a) and (b) to hydrothermal treatment to induce crystallisation.

By the process of the invention, it is possible to provide an MFI product in which the crystals are flat, i.e., having one dimension substantially smaller than the other two, while producing crystals that are sufficiently small to be used with advantage as seed crystals in a number of different processes. Advantageously one dimension is at most 50% of the larger of the other two. By control of the reaction conditions, in particular the ratio of component (a) to component (b), it is possible to control the particle size. At lower particle sizes, for example up to about 200 nm, the dimensions are typically in ratios within the range of from 0.3 to 0.4:0.7 to 0.8:1; at the higher particle sizes, for example between 200 nm and 550 nm, the dimensions are typically in ratios within the range of from 0.2 to 0.3:0.6 to 0.7:1. In this specification references to particle sizes are to the mean length of the largest dimension of the particles, as determined by inspection of scanning electron microphotographs (SEM) of the product crystals. In each case one dimension is about half the smaller of the remaining two dimensions, if they are different.

As indicated above, the particle size of the product may be controlled by varying the proportion of components (a) and (b), particle size varying inversely with the proportion of component (b). For example, in a typical case, a synthesis mixture containing about 10% by weight of component (b), based on the total weight of components (a) an (b), yields crystals in the range of from 110 to 200 nm, the crystals forming a suspension in the reaction mixture. Reducing the proportion of (b) to between 5 and 6% yields crystals of from 200 to 250 nm, which settle to the bottom of the reaction vessel, while reducing the proportion to about 0.5% yields still larger crystals, from 450 to 550 nm. It is preferred that the proportion of (b) is greater than 0.5% by weight.

Accordingly, in one preferred embodiment of the invention, a process is provided in which a suspension of zeolite crystals is formed, the crystals having a particle size of at most 200 nm, by employing a mixture of (a) and (b) in which (b) is an active mother liquor and the proportion of (b) is at least 5 % most preferably 6% by weight.

In a second preferred embodiment, a process is provided in which zeolite crystals of particle size of at least 200 nm are formed, by employing a mixture of (a) and (b) in which (b) is an active mother liquor and the proportion of (b) is at most 6% preferably at most 5% by weight.

If (b) is an aged aqueous alkaline synthesis mixture then less may be required compared to that needed when (b) is an active mother liquor, to achieve the same particle size or particle size distribution.

Surprisingly it has also been found that the near-colloidal non-spherical MFI zeolites of the present invention exhibit relatively low levels of twinning. This can be determined from an analysis of the SEM's of the materials. The MFI zeolites of the present invention exhibit less than 50% of crystals being twinned and preferably less than 25% being twinned.

In accordance with the process of the present invention, any suitable silica source may be employed, colloidal silica or silicic acid hydrate powder being especially suitable.

As structure directing agent, or template, there may be employed the tetrapropylammonium cation, either in the form of its hydroxide (TPAOH) or in the form of a salt, especially a halide, preferably the bromide (TPABr), or a mixture of salt and hydroxide.

The synthesis mixture may contain sources of other components necessary to prepare any molecular sieves of the MFI type. As examples of MFI molecular sieves, there may be mentioned silicalite and zeolite ZSM-5.

Component (a), having an OH—: $SiO_2$ ratio of at most 1.4:1, and hereinafter referred to as the low alkaline synthesis mixture, advantageously has a molar composition in the following ranges:

|  | At most | Preferably | Most preferably |
|---|---|---|---|
| OH–:$SiO_2$ | 1.4:1 | 0.032 to 0.7:1 | 0.044 to 0.7:1 |
| TPA+:$SiO_2$ | 0.4:1 | 0 to 0.150:1 | 0.052 to 0.150:1 |
| $M_2O$:$SiO_2$ | 0.7:1 | 0.016 to 0.35:1 | 0.022 to 0.35:1 |
| $H_2O$:$SiO_2$ | 7 to 1000:1 | 9 to 100:1 | 28 to 100:1 |

M=alkali metal or ammonia, preferably Na or K.

It will be appreciated that to achieve a low alkaline synthesis mixture, the template should be largely or preferably entirely in the form of a salt, e.g., the bromide. The low alkaline mixture may be aged.

As indicated above component (b) may be either an aged synthesis mixture or an active mother liquor or if desired a mixture of the two. If it is an aged synthesis mixture, it may be referred to as the highly alkaline, template-rich synthesis mixture, and advantageously has a molar composition in the following ranges:

|  | At least | Preferably | Most preferably |
|---|---|---|---|
| OH–:$SiO_2$ | 0.1:1 | 0.1 to 0.6:1 | 0.4 to 0.6:1 |
| TPA+:$SiO_2$ | 0.1:1 | 0.1 to 0.5:1 | 0.3 to 0.5:1 |
| $M_2O$:$SiO_2$ | — | 0 to 0.06:1 | 0.05 to 0.06:1 |
| $H_2O$:$SiO_2$ | 6:1 | 6 to 20:1 | 14 to 20:1 |

M=alkali metal or ammonia, preferably Na or K.

It will be appreciated that to achieve a highly alkaline synthesis mixture a part of the alkalinity may be provided by the organic template, which for this purpose may therefore be at least partially, and preferably largely, and most preferably entirely, in hydroxide form.

The high-alkaline synthesis mixture should be aged, as indicated above, for at least 1 month and may have been aged for up to one year. Ageing beyond one year is not expected to be advantageous and may result in crystallisation which is not desired for the aged solution. Ageing may be effected at room temperature, or below, or at any elevated temperature below that at which crystaliisation occurs. Ageing must be at greater than 0° C. and preferably is greater than 10° C.

If crystallisation does take place, for example if the high alkaline mixture is aged at an elevated temperature, e.g., at about 50° C., crystals may be removed, e.g., by centrifugation, and the remaining liquid is then an active mother liquor. The mother liquor will typically be depleted in $SiO_2$ and template compared to the high alkaline synthesis mixture used in its preparation and typically has a molar composition in the following ranges:

|  | At least | Preferably | Most preferably |
|---|---|---|---|
| OH–:$SiO_2$ | 0.16:1 | 0.16 to 41:1 | 0.2 to 41:1 |
| TPA+:$SiO_2$ | 0.16:1 | 0.16 to 40:1 | 0.6 to 40:1 |
| $M_2O$:$SiO_2$ | — | 0 to 0.6:1 | 0.1 to 0.6:1 |
| $H_2O$:$SiO_2$ | 16:1 | 16 to 2000:1 | 28 to 2000:1 |

M=alkali metal or ammonia, preferably Na or K.

The resulting mother liquor may then be aged for at least 1 month, at any temperature below which crystallisation occurs. The term of ageing is determined from the time of formation of the synthesis mixture.

After component (b) has been aged, components (a) and (b) are mixed in the desired proportion, and hydrothermally treated. Hydrothermal treatment may be carried out at elevated temperature, advantageously at least 120° C., and preferably at least 150° C., for a time sufficient for crystals to form. This may be relatively short, e.g., from 36 to 48 hours, or even less, especially if the treatment is carried out by microwave energization, in which case 1 hour suffices and a temperature of 120° C. may be sufficient. Microwave treatment may be carried out in a dielectric autoclave, preferably a rigid, high melting point, low loss factor, plastic, e.g., ptfe.

If the crystals resulting from hydrothermal treatment are below about 200 nm, and remain in suspension in the synthesis mixture, they may be separated from the mixture by centrifugation; if they are larger, and have settled, they may be separated by decanting, in each case washed if desired; washing may be until a wash water pH of 10 or below is reached. The product of the invention may, if desired or required, be calcined and/or subjected to cation exchange.

It is apparent from the larger crystals produced according to the invention, which are approaching the typical coffin-like shape of MFI crystals, that the flat plane of the crystals produced according to the invention is that of the known MFI product, i.e., the 010 plane. Accordingly, the crystals of the present invention may be used in the manufacture of a supported layer having a b-axis crystalline preferred orientation (CPO), i.e., with b-axis channels extending through the thickness of the layer by depositing the crystals on a porous support in such a way that the majority of crystals lie flat on the surface of the support and are subsequently grown together to form a continuous layer. Suitable methods for the manufacture of a supported layer are provided in WO 96/01683, PCT/EP9404034 and WO 96101687, the disclosures of which, as far as they relate to the production of such supported layers, are incorporated by reference. The supported layers may therefore be a membrane which has b-axis channels extending through the thickness of the layer.

The present invention also provides an MFI molecular sieve of crystal size within the range of 100 to 550 nm, the crystals having one dimension substantially smaller than the other two. Advantageously, one dimension is at most half the larger of the other two.

The invention further provides such an MFI molecular sieve of crystallite size within the range of 110 to 200 nm, the ratios of the dimension of which are in the ranges 0.3 to 0.4:0.0.7 to 0.8:1. The invention also provides such an MFI molecular sieve of crystallise size within the range of from 200 to 550 nm, the ratios of the dimensions of which are in the ranges of 0.2 to 0.3:0.6 to 0.7:1.

The invention further provides a process for the manufacture of a molecular sieve material, which process comprises preparing a synthesis mixture for formation of the desired molecular sieve and either including in the synthesis mixture or depositing on the surface of a substrate to be contacted with the synthesis mixture, as seeds, the non-spherical molecular sieve according to the present invention, and hydrothermally treating the synthesis mixture to form the desired molecular sieve.

These molecular sieve materials may be used as catalysts in catalytic processes and/or in separation processes such as for example adsorption processes. The molecular sieve material may be in the form of a membrane.

The following Examples, in which all parts and percentages are by weight, illustrate the invention.

(Ludox AS 40, du Pont, 40% $SiO_2$ in $H_2O$) were added, and the mixture stirred for 2 minutes.

Example B
High Alkaline Synthesis Mixture 1.154 g of NaOH were dissolved in 81.82 g TPAOH (Fluka 88111, 20% solution in water). Then 17.47 g of silicic acid hydrate (Baker 0324-5, 90% $SiO_2$,10% $H_2O$) were added with stirring. After cooling, the water lost by boiling was made up, and the resulting mixture stored at room temperature.

Example C
Active Mother Liquor

The procedure of Example B was followed until and including the water make-up stage, then the mixture was aged in an oil bath at so 50° C. under reflux for 14 days. Crystals had formed in the mixture, and were removed by centrifuging at 16000 r.p.m. for 6 hours. The supernatant was reserved as active mother liquor and stored at 4° C.

Examples 1 to 8 and Comparative Examples 1 and 2

The Table below shows the weights of low alkaline mixture (LA), high alkaline mixture (HA) and active mother liquor (ML) used, their ages, relative proportions, synthesis times and temperatures, the appearance of the resulting reactor slurry, and characteristics of the solid product.

| Example | LA, g, age | HA, g, age | ML, g, age | % HA or ML | Synthesis ° C. and, hours | Slurry Appearance | XRD Structure of separated material | Crystal Size longest dimension (SEM) Aspect Ratio |
|---|---|---|---|---|---|---|---|---|
| Comp. 1 | 49.99 fresh | — | — | — | 160° C., 48 h | bluish liquor | amorphous | — |
| Comp. 2 | 44.99 fresh | 5.01 fresh | — | 10.02 | 160° C., 48 h | bluish liquor | amorphous | — |
| 1 | 45.03 fresh | 5.02 7 months | — | 10.03 | 160° C., 48 h | white suspension | MFI | 110–150 0.4:0.7:1 |
| 2 | 45.00 6 days | 5.00 7 months | — | 10.00 | 160° C., 48 h | white suspension | MFI | 110–150 0.4:0.7:1 |
| 3 | 36.89 1 year | 4.06 7 months | — | 9.91 | 160° C., 48 h | blue-white suspension | MFI | 120–150 0.3:0.8:1 |
| 4 | 45.02 fresh | — | 5.00 1 month | 10.00 | 160° C., 48 h | white suspension | MFI | 160–200 0.4:0.8:1 |
| 5 | 42.52 fresh | — | 2.52 1 month | 5.6 | 160° C., 24 h | clear liquid, crystals settled | MFI | 200—250* 0.3:0.6:1 |
| 6 | 44.5 8 days | — | 0.50 1 month | 1.11 | 160° C., 24 h | clear liquid crystals settled | MFI | 330–370* 0.3:0.6:1 |
| 7 | 49.75 8 days | — | 0.25 1 month | 0.50 | 160° C., 111 h | clear liquid, crystals settled | MFI | 450–550* 0.2:0.6:1 |
| 8 | 9.00 8 days (ptfe autoclave) | 1.04 7 months | — | 10.36 | 160° C., 1 h, in Microwave | clear liquid, crystals settled | MFI | 120–140* 0.4:0.8:1 |

*= typical MFI coffin shape

EXAMPLES A TO C Preparation of Reactants

Example A
Low Alkaline Synthesis Mixture 0.6005 g of NaOH (Baker, 98% pure) were dissolved with stirring in 139.47 g deionized water. 4.63 g of TPABr (Fluka 88105, 98% pure) were added with stirring until the salt was completely dissolved. Finally, 50.07 g colloidal silica

What is claimed is:

1. A process for the manufacture of an MFI zeolite which comprises mixing (a) an aqueous alkaline synthesis mixture comprising a silica source and an organic template, the synthesis mixture having a molar $OH^-$:$SiO_2$ ratio of no greater than about 1.4:1, with (b) an active synthesis mixture being an active mother liquor which is derived from an aqueous synthesis mixture which has been used for at least one crystallization and the formed crystals having been removed,
and subjecting the mixture of (a) and (b) to hydrothermal treatment to induce crystallization.

2. The process recited in claim 1, wherein component (b) has a $OH^-$:$SiO_2$ mole ratio of at least 0.16:1, a $TPA^+$:$SiO_2$ mole ratio of at least 0.16:1, and a $H_2O$:$SiO_2$ mole ratio of at least 16:1.

3. The process recited in claim 1, wherein component (b) has the following composition in terms of mole ratios:

$OH^-$:$SiO_2$ 0.16 to 41:1
$TPA+$:$SiO_2$ 0.16 to 40:1
$M_2O$:$SiO_2$ 0 to 0.6:1
$H_2O$:$SiO_2$ 16 to 2000:1 wherein M is ammonia or alkali metal.

4. The process recited in claim 1, wherein component (b) has the following composition in terms of mole ratios:

$OH$-:$SiO_2$ 0.2 to 41:1
$TPA+$:$SiO_2$ 0.6 to 40:1
$M_2O$: $SiO_2$ 0.1 to 0.6:1
$H_2O$: $SiO_2$ 28 to 2000:1 wherein M is ammonia or alkali metal.

5. The process of claim 1 wherein the product of said crystallization consists of MFI zeolite crystals having a mean length of the largest dimension of the crystals of not more than 550 nm.

6. A process for the manufacture of an MFI zeolite which comprises mixing (a) an aqueous alkaline synthesis mixture comprising a silica source and an organic template, the synthesis mixture having a molar $OH^-$:$SiO_2$ ratio of no greater than about 1.4:1, with (b) an active synthesis mixture comprising an aged aqueous alkaline synthesis mixture comprising a silica source and an organic template, the aged synthesis mixture having a molar $OH^-$:$SiO_2$ ratio of at least 0.1:1 and a molar organic template: $SiO_2$ ratio within the range of 0.1 to 0.5:1, and subjecting the mixture of (a) and (b) to hydrothermal treatment whereby MFI zeolite crystals are formed having a mean length of the largest dimension of the crystals of not more than of 550 nm.

7. The process of claim 6 wherein greater than 0.5 up to about 10% by weight of component (b) is mixed with component (a), based on the total weight of components (a) and (b).

8. The process recited in claim 6, wherein (b) is aged for at least one month.

9. The process recited in claim 6, wherein component (b) has a $H_2O$:$SiO_2$ molar ratio of at least about 6:1.

10. The process recited in claim 6, wherein component (b) has the following composition in terms of mole ratios:

$OH^-$:$SiO_2$ 0.1 to 0.6:1
$TPA+$:$SiO_2$ 0.1 to 0.5:1
$M_2O$:$SiO_2$ 0 to 0.06:1
$H_2O$:$SiO_2$ 6 to 20:1 wherein M is ammonium or alkali metal.

11. The process recited in claim 6, wherein component (b) has the following composition in terms of mole ratios:

$OH^-$:$SiO_2$ 0.4 to 0.6:1
$TPA+$:$SiO_2$ 0.3 to 0.5:1
$M_2O$:$SiO_2$ 0.05 to 0.06:1
$H_2O$:$SiO_2$ 14 to 20:1 wherein M is ammonia or alkali metal.

12. The process recited in claim 1 or 6, in which a suspension of zeolite crystals is formed, the crystals having a particle size of at most 200 nm, by employing a mixture of (a) and (b) in which the proportion of (b) is at least 5% by weight.

13. The process recited in claim 1 or 6, in which zeolite crystals of particle size of at least 200 nm are formed by employing a mixture of (a) and (b) in which the proportion of (b) is no greater than about 6% by weight.

14. A process as claimed in claim 1 or 6, wherein said aqueous alkaline synthesis mixture (a) has a molar ratio of $TPA^+$:$SiO_2$ no greater than about 0.4:1, a molar ratio of $M_2O$:$SiO_2$ no greater than 0.7:1, and a molar ratio of $H_2O$:$SiO_2$ from about 7 to about 1000:1;

wherein M is an alkali metal or ammonia.

15. The process recited in claim 1 or 6, wherein said aqueous alkaline synthesis mixture (a) has the following composition in terms of mole ratios:

$OH^-$:$SiO_2$ 0.032 to 0.7:1
$TPA+$:$SiO_2$ 0 to 0.150:1
$M_2O$:$SiO_2$ 0.016 to 0.35:1
$H_2O$:$SiO_2$ 9 to 100:1 wherein M is ammonia or alkali metal.

16. The process recited in claim 1 or 6, wherein said aqueous alkaline synthesis mixture (a) has the following composition in terms of mole ratios:

$OH^-$:$SiO_2$ 0.044 to 0.7:1
$TPA+$:$SiO_2$ 0.052 to 0.150:1
$M_2O$:$SiO_2$ 0.022 to 0.35:1
$H_2O$:$SiO_2$ 28 to 100:1 wherein M is ammonia or alkali metal.

17. The process recited in claim 1 or 6, wherein the hydrothermal treatment is carried out at a temperature of at least 150° C.

18. The process recited in claim 1 or 6, wherein the hydrothermal treatment is carried out for a period of from about 36 to about 48 hours.

19. The process recited in claim 1 or 6, wherein the hydrothermal treatment is carried out in a microwave at a temperature of at least 120° C. and for a period of 1 hour or less.

20. The process recited in claim 1 or 6, wherein the MFI zeolite is calcined and/or subjected to cation exchange.

21. The process recited in claim 1 or 6, wherein the MFI zeolite is silicalite or ZSM-5.

22. A process for the manufacture of a molecular sieve material, which process comprises preparing a synthesis mixture for formation of the desired molecular sieve and either including in the synthesis mixture or depositing on the surface of a substrate to be contacted with the synthesis mixture as seeds, a non-spherical MFI zeolite prepared according to claim 1 or 6, and hydrothermally treating the synthesis mixture to form the desired molecular sieve.

23. The process recited in claim 22, wherein the molecular sieve material is a zeolite membrane.

24. The process recited in claim 23, wherein the zeolite membrane has a Crystalline Preferred Orientation which is b-axis.

25. An MFI molecular sieve of crystallite size within the range of 110 to 200 nm, the ratios of the dimension of which are in the ranges 0.3 to 0.4:0.7 to 0.8:1.

26. An MFI molecular sieve of crystallite size within the range of from 200 to 550 nm, the ratios of the dimensions of which are in the ranges of 0.2 to 0.3 to 0.7:1.

27. An MFI molecular sieve of three dimensional crystallite size such that the mean length of the largest dimension of the crystals is in the range of 100 to 550 nm, the mean length of the smallest dimension of said crystals being at most half of the largest crystal dimension and the mean length of an intermediate dimension of said crystals being in the ratio of 0.6 to 0.8:1 with respect to said largest dimension.

* * * * *